(12) United States Patent
Liu et al.

(10) Patent No.: US 10,924,254 B2
(45) Date of Patent: Feb. 16, 2021

(54) METHOD AND SYSTEM FOR LONG-DISTANCE FULL-DUPLEX WIRELESS COMMUNICATION

(71) Applicant: KIWI TECHNOLOGY INC., Hsinchu County (TW)

(72) Inventors: Jian-Hong Liu, Hsinchu County (TW); Chun-Yu Wang, Hsinchu County (TW); Tsung-Chih Huang, Hsinchu County (TW)

(73) Assignee: KIWI TECHNOLOGY INC., Hsinchu County (TW)

( * ) Notice: Subject to any disclaimer, the term of this patent is extended or adjusted under 35 U.S.C. 154(b) by 241 days.

(21) Appl. No.: 16/180,793

(22) Filed: Nov. 5, 2018

(65) Prior Publication Data

US 2019/0334690 A1    Oct. 31, 2019

(30) Foreign Application Priority Data

Apr. 27, 2018   (TW) ................................ 10711456.1

(51) Int. Cl.
*H04L 5/14* (2006.01)
*H04W 72/12* (2009.01)
(Continued)

(52) U.S. Cl.
CPC .............. *H04L 5/14* (2013.01); *H04W 72/12* (2013.01); *H04W 74/0808* (2013.01); *H04W 88/16* (2013.01)

(58) Field of Classification Search
CPC ....... H04L 5/14; H04L 5/1446; H04L 5/1438; H04W 72/12; H04W 74/0808;
(Continued)

(56) References Cited

U.S. PATENT DOCUMENTS 8,457,094 B2    6/2013   Frei et al.
8,804,590 B2 *  8/2014   Nakae ................... H04W 28/22
                                                   370/311
(Continued)

FOREIGN PATENT DOCUMENTS

CN    105471785 A    4/2016
CN    106664723 A    5/2017
(Continued)

*Primary Examiner* — Will W Lin
(74) *Attorney, Agent, or Firm* — Li & Cai Intellectual Property (USA) Office

(57) ABSTRACT

The disclosure is related to a method and a system for long-distance full-duplex wireless communication. The system is mainly composed of a control circuit, at least one wireless transmission module and one or more wireless gateway modules. The wireless gateway module can receive data from a terminal node via one of multiple channels. The control circuit instructs a wireless transmission module to transmit data. The system utilizes the wireless transmission module to deal with the data from the gateway modules. In the method, in order to achieve full-duplex communication, the system obtains transmission parameters of every terminal node, sets up a transmission schedule with respect to signals having various frequencies within designated time slots according to the operating environment of the node, assigns a transmission priority within the time slots and stores the setting in the node.

14 Claims, 9 Drawing Sheets

(51) Int. Cl.
*H04W 74/08* (2009.01)
*H04W 88/16* (2009.01)

(58) Field of Classification Search
CPC ... H04W 88/16; H04W 88/14; H04W 84/047; H04W 28/16; H04W 72/0446
See application file for complete search history.

(56) References Cited

U.S. PATENT DOCUMENTS

| | | | | |
|---|---|---|---|---|
| 8,924,587 | B2* | 12/2014 | Petite | G08B 25/007 709/238 |
| 2004/0174841 | A1 | 9/2004 | Kubler et al. | |
| 2013/0150106 | A1* | 6/2013 | Bucknell | H04W 4/70 455/501 |
| 2015/0125832 | A1* | 5/2015 | Tran | G09B 19/0092 434/127 |
| 2015/0230272 | A1* | 8/2015 | Liu | H04W 24/02 370/252 |
| 2015/0294431 | A1* | 10/2015 | Fiorucci | G07B 15/02 705/13 |
| 2016/0041534 | A1* | 2/2016 | Gupta | H04W 4/70 700/275 |
| 2016/0094268 | A1 | 3/2016 | Seller | |
| 2016/0343225 | A1* | 11/2016 | Lee | G08B 17/06 |
| 2016/0360559 | A1* | 12/2016 | Chrisikos | H04W 8/005 |
| 2017/0230961 | A1 | 8/2017 | Park et al. | |
| 2017/0244521 | A1* | 8/2017 | Lim | H04L 1/1819 |
| 2017/0272316 | A1* | 9/2017 | Johnson | H04L 67/34 |
| 2018/0110057 | A1* | 4/2018 | Park | H04B 7/0404 |
| 2018/0234902 | A1* | 8/2018 | Talbert | H04W 24/02 |
| 2019/0037376 | A1* | 1/2019 | Liu | H04W 4/70 |
| 2019/0043064 | A1* | 2/2019 | Chin | G06Q 30/0282 |
| 2019/0045412 | A1* | 2/2019 | Shivam | H04W 28/08 |
| 2019/0059102 | A1* | 2/2019 | Yerramalli | H04L 1/0026 |
| 2019/0191456 | A1* | 6/2019 | Koorapaty | H04W 74/0816 |
| 2019/0364492 | A1* | 11/2019 | Azizi | H04W 4/029 |
| 2020/0225655 | A1* | 7/2020 | Cella | G05B 23/0264 |
| 2020/0252876 | A1* | 8/2020 | Yeon | H04W 4/021 |
| 2020/0271488 | A1* | 8/2020 | Tanutama | G01D 21/00 |

FOREIGN PATENT DOCUMENTS

| | | |
|---|---|---|
| CN | 107360539 A | 11/2017 |
| CN | 206759742 U | 12/2017 |
| JP | 2008236477 A | 10/2008 |
| JP | 2018526838 A | 9/2018 |
| TW | 201709689 A | 3/2017 |
| TW | 201806351 A | 2/2018 |
| WO | 2012086151 A1 | 6/2012 |
| WO | 2016015650 A1 | 2/2016 |
| WO | 2017019133 A1 | 2/2017 |

* cited by examiner

METHOD AND SYSTEM FOR LONG-DISTANCE FULL-DUPLEX WIRELESS COMMUNICATION

CROSS-REFERENCE TO RELATED PATENT APPLICATION

This application claims the benefit of priority to Taiwan Patent Application No. 107114561, filed on Apr. 27, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The disclosure relates to a communication method and system, and more particularly to a method and a system for long-distance full-duplex wireless communication that creates a transmission schedule for signals with different frequencies using a designated time slot.

BACKGROUND OF THE DISCLOSURE

A conventional wireless communication technology performs data transmission through a gateway, and in particular between two network domains. The conventional circuit design of the wireless gateway is to dispose a gateway circuit for processing packets received from the terminals, a controller for operating the gateway and a transceiver for delivering data into a wireless gateway. It is possible to dispose multiple wireless gateways in a network system so as to process more data generated by the terminals.

In a specific wireless network system, reference is made to FIG. 1; a framework of the system shows a plurality of wireless gateways 101, 102 and 103 that can be a kind of long range (LoRa) concentrators. This kind of long-distance and low-power-consumption communication technology is applicable to IoT (Internet of Things). The LoRa concentrator is capable of bi-directional communication for linking with terminals A, B, C, D and E. The terminals A, B, C, D and E can be the various sensors and electronic devices of IoT. The wireless gateways 101, 102 and 103 process the data transmitted by the terminals A, B, C, D and E. The terminals A, B, C, D and E can be respectively connected with the same or different wireless gateways 101, 102 and 103 by a specific communication protocol such as WiFi™, Bluetooth™, or Zigbee. The wireless gateways 101, 102 and 103 can transmit the data to back-end application devices 111, 112 and 113 via a network server 110.

For example, the terminals A, B, C, D and E are such as the environmental sensors disposed in a plant. The sensors can be a smoke detector, a thermometer, a hygrometer, a light sensor, a power sensor, a video monitor, and/or various electronic nodes. For receiving the signals generated by the terminals A, B, C, D and E, some wireless gateways 101, 102 and 103 may be required at some places. A network server 110 is also provided for collecting the data from the gateways 101, 102 and 103 and then providing for the back-end applications. The back-end application devices 111, 112 and 113 may form an IoT ecosystem that provides the functionalities such as power monitoring, plant temperature and humidity monitoring, personnel movement monitoring, and equipment monitoring.

According to a conventional solution, the LoRa concentrator operates with an LBT (Listen Before Talk) module for forming a communication unit. Multiple communication units extend a signal range of the system and provide various applications. This configuration causes the LoRa concentrator to have the function of LBT. Before processing the data transmission, the assembly of LoRa concentrator and the LBT module allows the wireless communication system to gain an idle channel used for data transmission by performing a process of clear channel assessment (CCA) through the LBT module.

SUMMARY OF THE DISCLOSURE

The disclosure is related to a method for long-distance full-duplex wireless communication and a communication system thereof. The communication system includes one or more wireless gateway modules. Every wireless gateway module includes a gateway controller and a wireless gateway transceiver that can connect with one or more terminal nodes through a multi-channel technology for receiving data from the nodes. The system includes at least one wireless transmission module that includes a wireless transceiver and a controller for transmitting data. The system includes a control circuit that connects with the wireless gateway modules and the wireless transmission module via a connection line.

In the method performed by the control circuit for the long-distance full-duplex wireless communication, in one embodiment, the system acquires transmission parameters from every terminal node. The system then conducts a transmission schedule with respect to different frequencies within a designated time slot according to an operating environment of the node. In the meantime, within a plurality of time slots of a beacon period, a transmission priority is applied to the wireless gateway modules and the wireless transmission module of the system. Every node stores a setting thereof. The terminal node can perform the long-distance full-duplex wireless communication to transmit data based on this setting.

The method for long-distance full-duplex wireless communication is adapted to a communication system. The communication system receives data from the various terminal nodes via the wireless gateway module according to the transmission schedule. When the control circuit performs the method, the wireless transmission module is enabled to transmit data. The wireless transmission module can process data from the plurality of wireless gateway modules. The system is therefore scalable and achieves one-to-multiple wireless communication technology.

In the process of transmitting the data, the terminal node computes a margin value based on a signal quality and accordingly determines a transmission rate. Therefore, the system can effectively transmit the data with low latency. Further, the mechanism of transmission schedule in time slots can ensure data transmission without packet loss.

According to the embodiment of the communication method, while receiving the message from the wireless gateway module, the control circuit computes the transmission time according to the packet size and a timing related to a transmission timestamp of the message, and generates a transmission request. After that, both the transmission time and the data enter a transmission queue. Next, the control circuit obtains a transmission request and data from the transmission queue according to a transmission time. The transmission request and data are transmitted to the wireless transmission module. The wireless transmission module then decides a transmission channel for transmitting the data.

The wireless gateway module can be a LoRa concentrator that is originally a concentrator that supports bidirectional transmission. The wireless transmission module can be a LBT module supporting the long-distance wireless communication. In the system, the LoRa concentrator is configured to be a one-way receiver that is used to work with the one-way LBT module. The LBT module processes data received by the one or more LoRa concentrators through the control circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
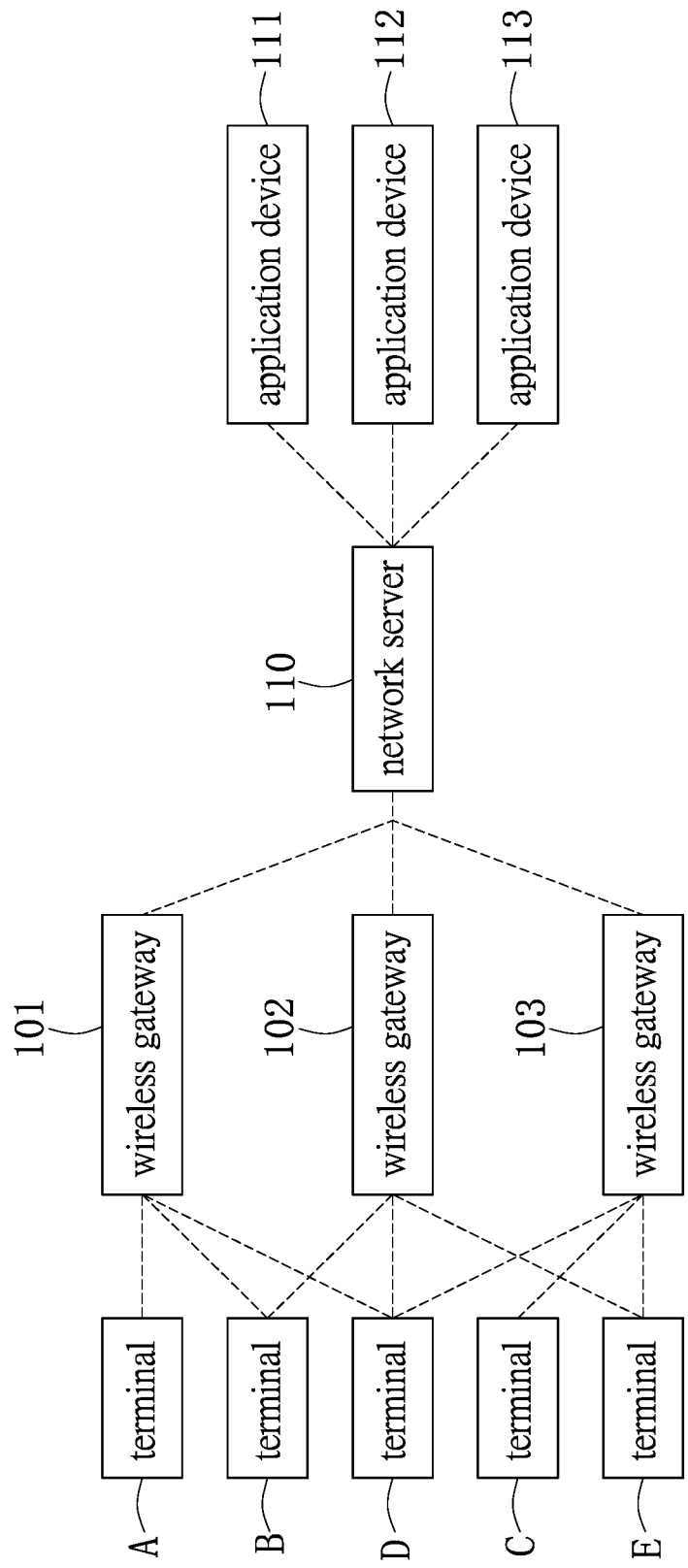
FIG. 1 shows a framework of a conventional network system for processing data of terminal.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The disclosure is related to a method for long-distance full-duplex wireless communication, and a communication system. The communication system, in one embodiment, essentially includes one or more wireless gateway modules, at least one wireless transmission module and a control circuit. The wireless gateway module connects with the various terminal nodes through a multi-channel technology. The terminal nodes form an environment of IoT. In the long-distance full-duplex wireless communication method, the wireless gateway module is configured to receive data transmitted by the terminal nodes within a preset time slot and through a specific channel. The wireless transmission module responds to the transmission made by the wireless gateway module in a next time slot. Further, the wireless transmission module decides a transmission channel and transmits the data. It should be more efficient since the system incorporates the time slots.

Under the framework of the communication system, a full-duplex wireless communication is supported. In one embodiment, a LoRa communication protocol is incorporated with the aspect of time slots. It also achieves the purpose of low latency since the response occurs in a next preset time slot. This allows the response to be very quick so that data transmission can be ensured. In one further aspect of the disclosure, the terminal node can set up an adaptive approximate transmission rate according to signal quality of the downlink packet.

Figure 2:
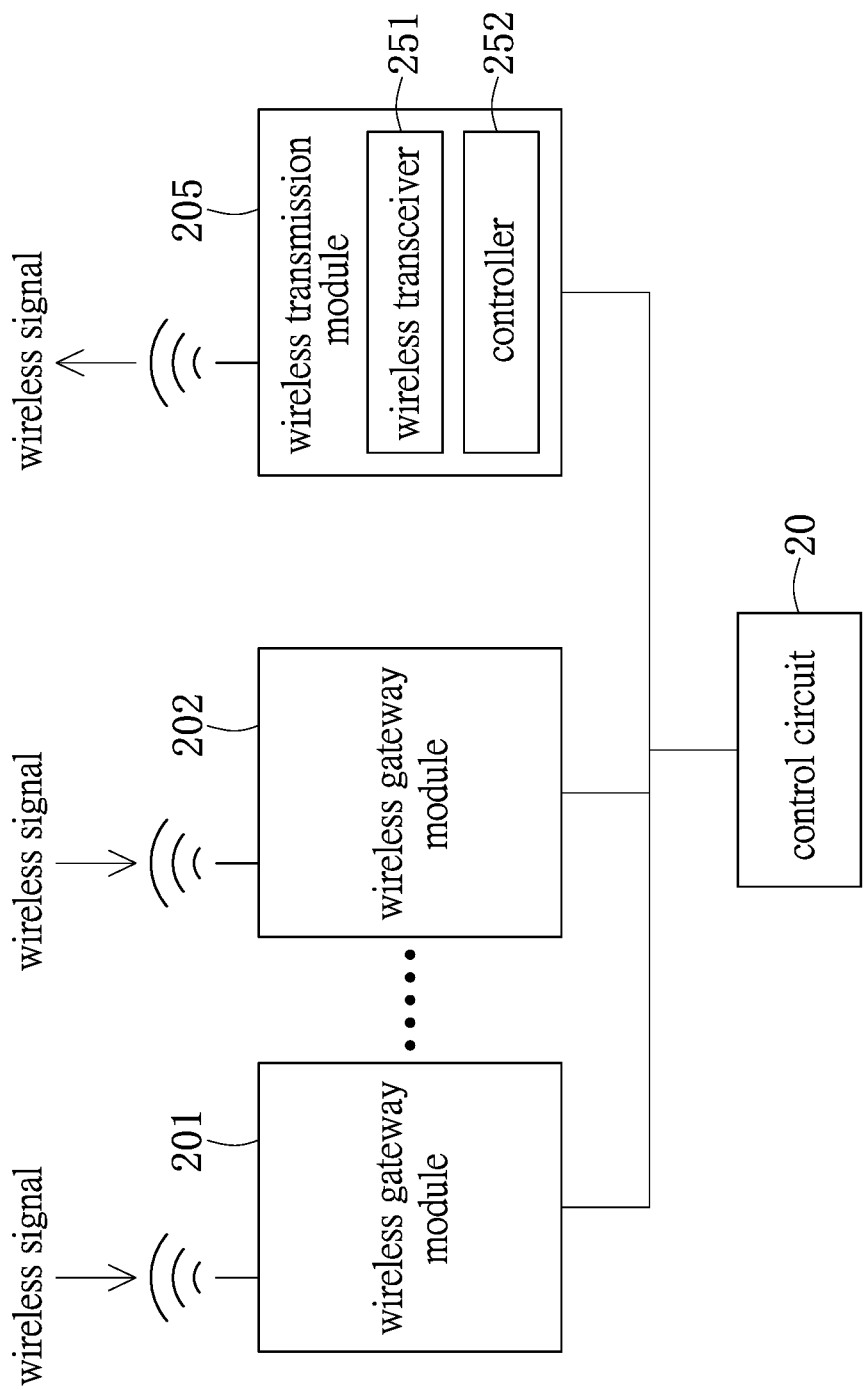
FIG. 2 shows a schematic diagram depicting a framework of a long-distance full-duplex wireless communication system in one embodiment of the disclosure.
Figure 4:
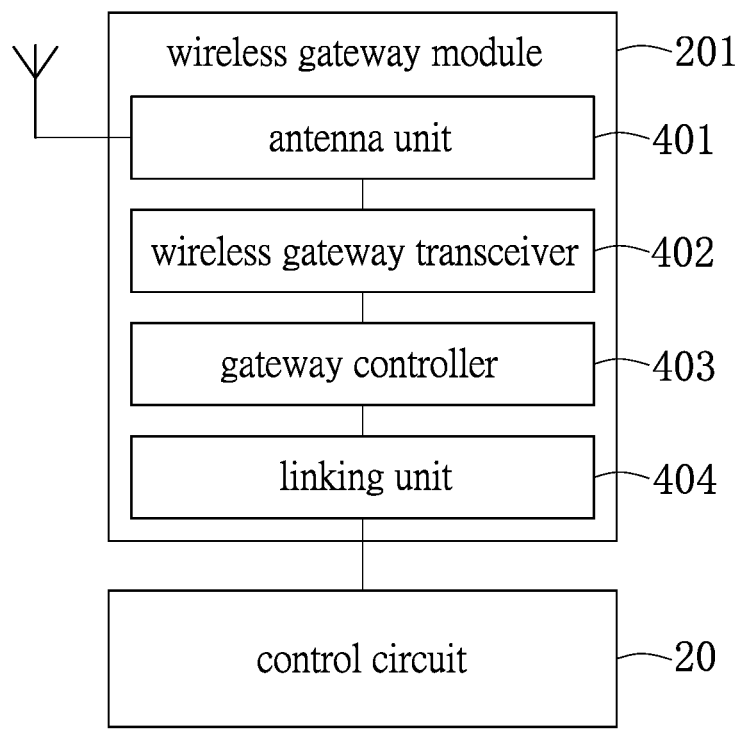
FIG. 4 shows a block of a circuit of a wireless gateway module of the communication system according to one embodiment of the disclosure.

Reference is made to FIG. 2 shows a schematic diagram depicting a framework of the long-distance full-duplex wireless communication system in one embodiment of the disclosure. The system essentially includes one or more wireless gateway modules 201, 202, a wireless transmission module 205 and a control circuit 20. One wireless transmission module 205 can deal with the data that the wireless gateway modules 201, 202 receive from the terminal node. The number of the modules shown in the figure is not used to limit the scope of the invention. Depending on the particular implementation, the system may utilize more than one wireless transmission module 205. The main circuits of each of the wireless gateway modules 201 and 202 are a gateway controller and a wireless gateway transceiver, as shown in FIG. 4. The wireless gateway modules 201, 202 support bidirectional communication with multiple channels that are configured to connect with the various terminal nodes. In the communication system, the one-way multiple channels only used to receive data can avoid interference caused by the conventional design that the same data processing circuit is shared by both receiving and transmitting tasks in a bidirectional communication. The wireless transmission module 205 is configured to transmit data.

The wireless gateway modules 201 and 202 connect with the terminal nodes that are such as sensors, electronic devices, and/or home appliances. The wireless gateway module 201 or 202 is exemplified as the LoRa concentrator. The communication between the wireless gateway module 201 or 202 and the terminal node is not limited to any specific protocol, but can be any wireless communication protocol such as WiFi™, Bluetooth™, or a LPWAN, being an acronym for 'Low-Power Wide Area Network.'

The wireless transmission module 205 is connected with one or more wireless gateway modules 201, 202, and used to conduct data transmission through internal wireless transceiver 251 and the controller 252. The controller 252 receives a transmission instruction with a transmission request and data from a control circuit 20. The controller 252 then decides a transmission channel for transmitting data through the wireless transceiver 251.

In one embodiment of the disclosure, the wireless transmission module 205 can be an LBT module that supports a long-range wireless communication, e.g. LoRa. The LBT is an acronym for 'Listen Before Talk.' While the LBT module is in operation, it is necessary for the LBT module to wait for the control circuit 20 of the system to transmit instructions. When receiving the transmission instruction, the instruction is analyzed to obtain a transmission time based on a timestamp, and a transmission channel. The data can be transmitted via the channel specified by the control circuit 20, e.g. responding an ACK (Acknowledge signal). The mechanism of Listen Before Talk (LBT) is to detect if the channel is available through a clear channel assessment (CCA). In the meantime, the transmission time can be adjusted within an explicit time period, e.g. one millisecond to ten milliseconds. Thus, the communication system adopting this mechanism of Listen Before Talk can assess if the channel is available for enabling data transmission or unavailable (free/non-free) through the LBT mechanism in advance.

Further, to expand coverage of the wireless communication system and its applications, e.g. IoT, a huge amount of sensor signals are generated. Therefore, a sufficient number of wireless gateway modules are required in the wireless communication system to expand its signal coverage. The wireless communication system is able to satisfy the requirement by increasing the wireless gateway modules, or adding the wireless transmission modules to process the data generated by the wireless gateway modules through the multiple channels.

The control circuit 20 is a main control circuit of the communication system. The control circuit 20 can be a circuit module, an integrated circuit, or a combination of software and hardware. The control circuit 20 connects with one or more wireless gateway modules 201, 202 and the at least one wireless transmission module 205 via a bus, a wired connection or a wireless connection line. The control circuit 20 then receives data from one of the wireless gateway modules 201 and 202, and determines a transmission time. Finally, the wireless transmission module 205 is controlled by the control circuit 20 for transmitting the data.

Figure 3:
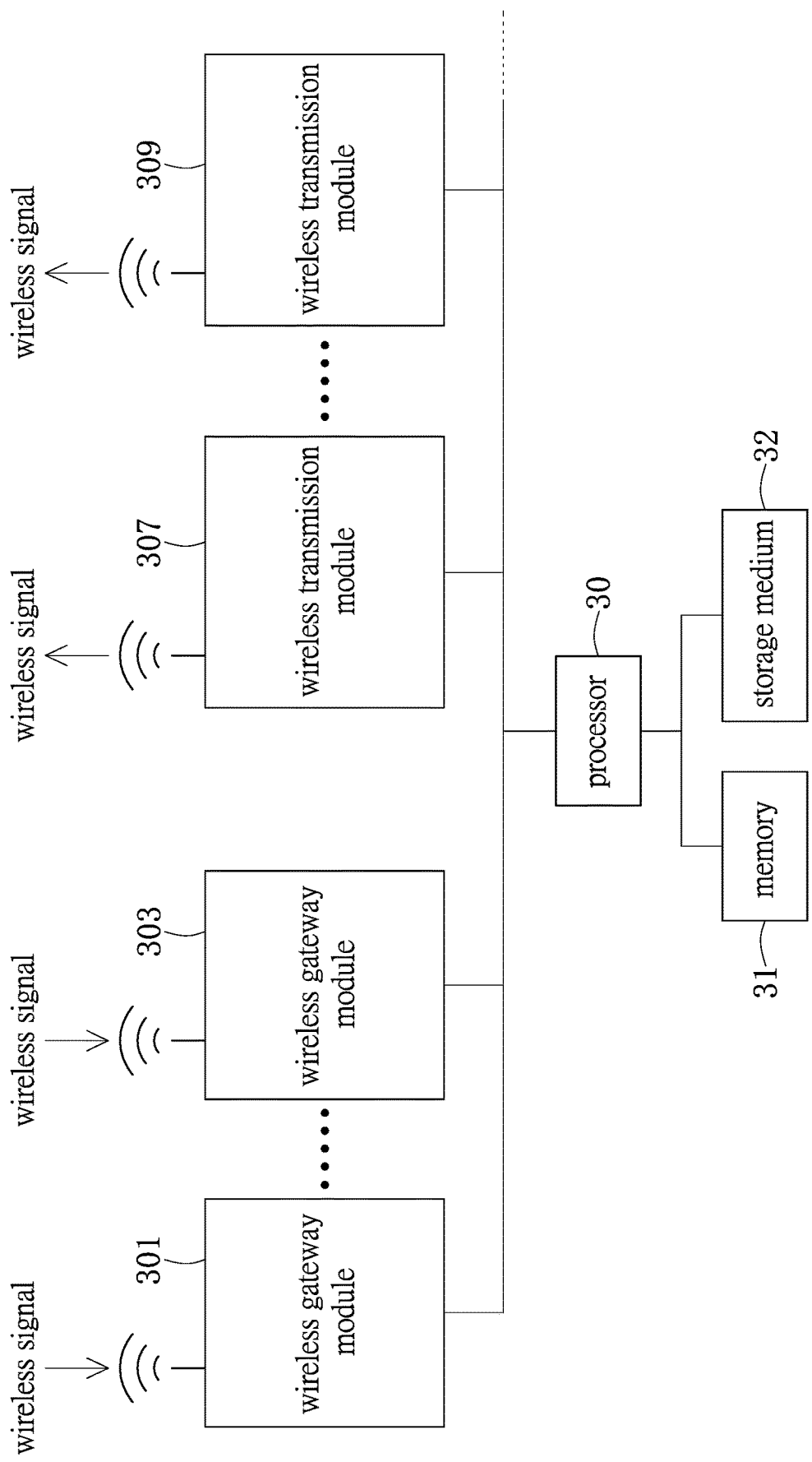
FIG. 3 shows another schematic diagram depicting a framework of a long-distance full-duplex wireless communication system in one further embodiment of the disclosure.

FIG. 3 shows another schematic diagram depicting a framework of the long-distance full-duplex wireless communication system. Under this framework, the system includes a plurality of wireless gateway modules 301, 303 that are used to receive data from the various terminal nodes. For example, the data received from the terminal nodes can be the sensor data, communication data generated by the electronic device, or operating data generated by the home appliances. Similarly, the wireless gateway modules 301, 303 can be a LoRa concentrator that utilizes WiFi™, Bluetooth™ or LPWAN to the connection line there-between.

The communication system exemplarily includes wireless transmission modules 307, 309, each of which processes the data received by the wireless gateway modules 301, 303. The communication system receives data through the one-way multiple channels without interference from the receiving and transmitting operations of the conventional bidirectional communication. Further, adding the concept of modularization to the communication system, it is characterized that the system has great flexibility and scalability since it can adopt more than one wireless transmission modules 307, 309.

In the embodiment, the control circuit includes a processor 30, a memory 31 and a storage medium 32. In addition to managing operations of the modules, the processor 30 is used to process the signals that are received or transmitted. The memory 31 is used to buffer the signals. The storage medium 32 stores the requisite data for operating the system, and also the information of the preset time slots and transmission channels of the long-distance full-duplex wireless communication system for receiving and transmitting packets with the terminal nodes. The information stored in the storage medium 32 allows the system to apply the time slots and transmission channels more efficiently. The full-duplex communication can also be achieved.

The primary circuits of the communication system are described in FIG. 4 that shows a block diagram depicting a wireless gateway module of the communication system according to one embodiment of the disclosure.

A wireless gateway module 201 is described in the diagram. The wireless gateway module 201 includes an antenna unit 401, a wireless gateway transceiver 402, a gateway controller 403 and a linking unit 404. The wireless gateway module 201 operates between different network segments, and connects with one or more terminal nodes by a multi-channel technology. The wireless gateway module 201 receives data, i.e. RF signals, from the terminal nodes by the antenna unit 401. The wireless gateway transceiver 402 integrates the functions of data receiving and transmission of the original wireless gateway module 201. From the RF signals transmitted from the terminal nodes, data and timestamp can be obtained. The gateway controller 403 controls operations of the wireless gateway module 201. The gateway controller 403 also controls the time that the antenna unit 401 and the wireless gateway transceiver 402 receive signals and transmit the data to the control circuit 20 via the linking unit 404 and the connection line.

Figure 5:
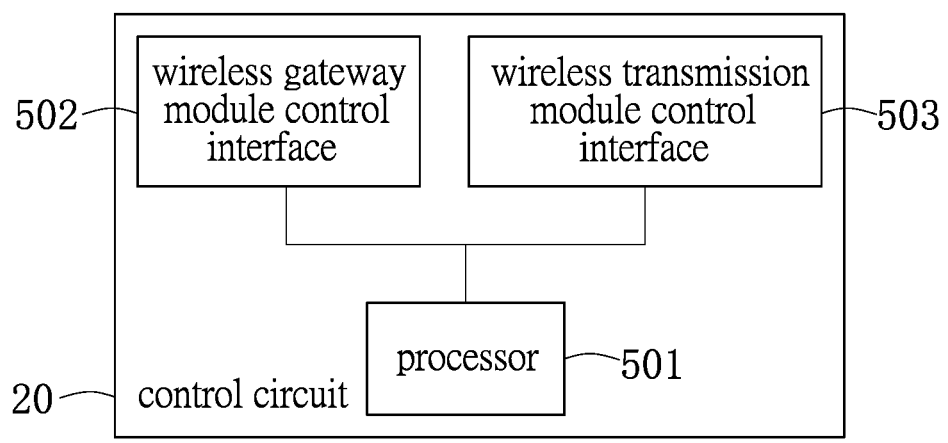
FIG. 5 shows a block of a circuit of a control circuit of the communication system according to one embodiment of the disclosure.

Reference is made to FIG. 5 that shows a circuit block diagram describing the control circuit of the communication system in one embodiment of the disclosure. The control circuit 20 includes a processor 501, a wireless gateway module control interface 502 and a wireless transmission module control interface 503.

The processor 501 is used to execute a communication method operated in the wireless communication system. The wireless gateway module control interface 502 is electrically connected to the processor 501. The wireless gateway module control interface 502 connects with one or more wireless gateway module of the system via a bus, a wired connection or a wireless connection, and receives data generated by one or more terminal nodes from one of the wireless gateway modules. The wireless transmission module control interface 503 is electrically connected to the processor 501, and the wireless transmission module via a bus, a wired connection or a wireless connection. The control circuit 20 transmits data processed by the processor 501 to the wireless transmission module via the wireless transmission module control interface 503.

In the communication method performed by the processor 501, the control circuit 20 receives the data from one of the wireless gateway modules of the system via the wireless gateway module control interface 502. The data can be the packets that are required to be transmitted. The data may include the SYN/ACK signals. A transmission time can be calculated according to the size of the data packets, a timestamp thereof and/or the time necessary for the processor 501 to process the data. A transmission request is therefore generated. Both the transmission request and the data are put to a transmission queue and waiting for further command.

By the processor 501, the system retrieves the transmission request and data from the queue according to the transmission time. The system then transmits the transmission request and the data to the wireless transmission module via the wireless transmission module control interface 503. The wireless transmission module decides a transmission channel for transmitting the data.

As discussed above, the wireless gateway module can be a LoRa concentrator, and the wireless transmission module can be a LBT module that supports the long-distance wireless communication. In one aspect of the disclosure, a communication system can expand its signal coverage through the communication module essentially consisting of a plurality of LoRa concentrators and LBT modules. The communication module can provide various applications. The conventional LoRa concentrator is therefore given the function of Listen Before Talk. The control circuit 20 needs to handle the operations of the plurality of LoRa concentrators, such as the transmission time and channels. It should be noted that the control circuit 20 considers the time spent under the Listen Before Talk mechanism as the transmission time that is also the time spent for assessing if the channel is available to transmit data through the process of clear channel assessment (CCA). Therefore, the system can operate under the network environment including the plurality of LoRa concentrators. When the data firstly reaches the LBT module, the LBT module can assess if the channel is available to transmit data in advance and thus activate the function of transmission thereof.

In the communication system of the disclosure, the LoRa concentrator is originally a concentrator supporting bi-directional transmission and reception and is able to receive data transmitted by the terminal node under a LPWAN wireless communication protocol. This LoRa concentrator is configured to be a one-way receiver for the communication system, and operated with the one-way transmitter, i.e. the LBT module. The control circuit 20 is employed in this communication system for linking the LBT module and the plurality of LoRa concentrators. The LoRa concentrators can therefore connect with another LBT module by this connectivity. The communication system can expand its signal coverage by increasing the number of LoRa concentrators or LBT modules, and still keep the LBT function through more simplified circuit design.

Through this design, the control circuit 20 controls the LoRa concentrator to process data reception and the LBT module to process data transmission. The separation of the processes of data transmission and reception in the communication system improves efficiency of the system that utilizes one communication module to process both operations of transmission and reception. When the communication system incorporates the LBT mechanism, the transmission time can be calculated by referring to the operational timing of LBT module.

In the method for long-distance full-duplex wireless communication of the disclosure according to one embodiment, when the wireless gateway module receives data from a terminal node, the data can be an uplink packet which is transmitted in a specific channel within a preset time slot. The configuration of the preset time slot and the channel is based on a transmission schedule setting for the terminal node by the system. The transmission schedule for the terminal node to transmit the uplink packet is stored in a memory of every terminal node. The different terminal nodes transmit their uplink packets in different preset time slots or different channels. Every terminal node in the long-distance full-duplex wireless communication system can be set up to transmit data via a specific channel with a specified time slot. In one embodiment, it is necessary for the terminal nodes to exclude conflicts with each other when the transmission schedules are set for these terminal nodes. It is more efficient for the terminal nodes to use the time slots since the terminal nodes can transmit data in different channels within the same slot.

Figure 6:
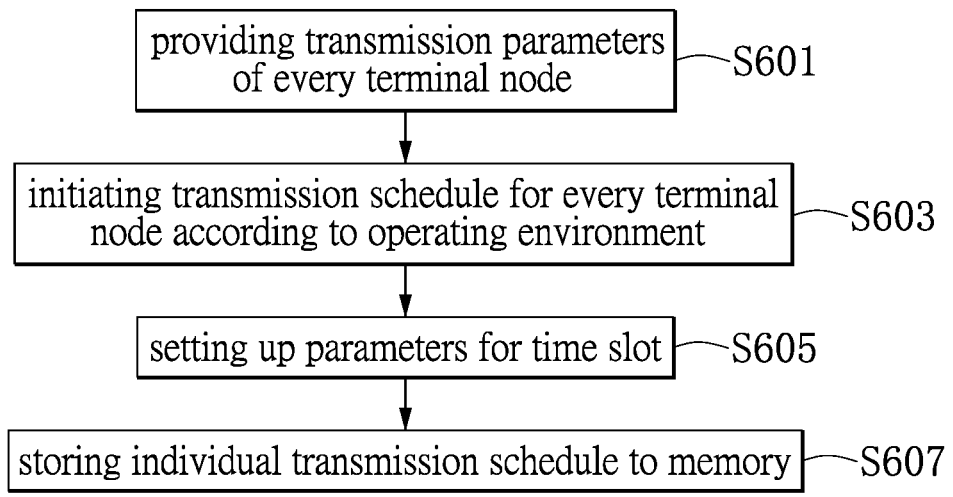
FIG. 6 shows a flow chart describing a method for long-distance full-duplex wireless communication in one embodiment of the disclosure.

Reference is made to FIG. 6 showing a schematic diagram describing setting up the transmission schedule. In step S601, the system obtains transmission parameters provided by each of the terminal nodes. The transmission parameters are such as a communication protocol, a format, a transmission rate, a channel, a power and a coding. Further, one of the transmission parameters is a signal quality, e.g. signal strength, and/or bandwidth, that will be affected by position of the terminal node. These parameters form an operating environment of a terminal node. In step S603, the system, through its processor, initiates the transmission schedule for every terminal node according to the operating environment. In step S605, the system sets up the related parameters for the time slot allocated to every terminal node. In step S607, the setting of individual transmission schedule is stored in the memory of every terminal node.

The preset time slot is configured to be allocated to the terminal node for transmitting data within a designated time slot. For the system and the individual terminal node, the time slot is predetermined in the system and therefore allows the system to transmit data more efficiently.

Figure 7:
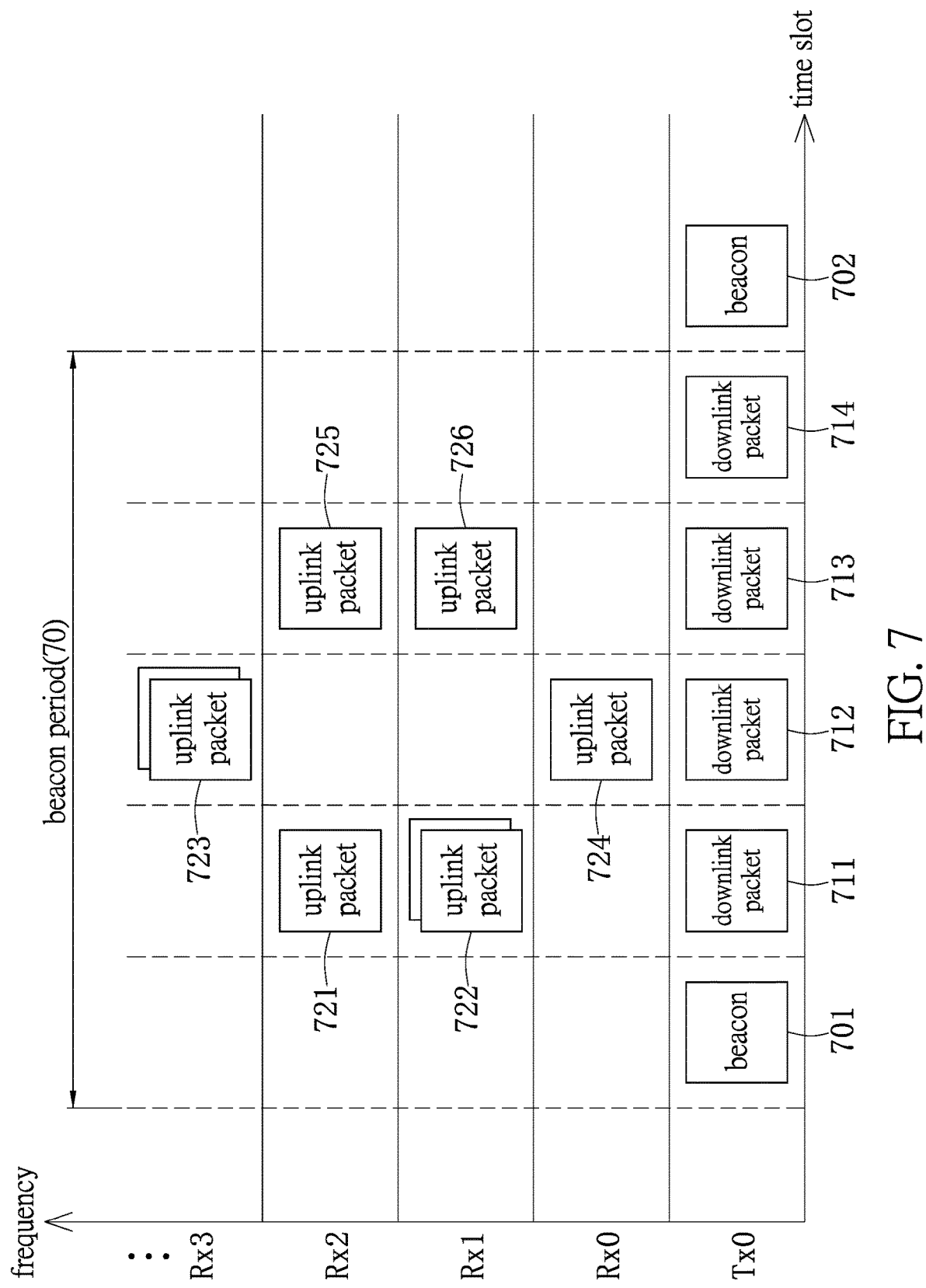
FIG. 7 shows a chart depicting setting up a transmission schedule in the method for long-distance full-duplex wireless communication according to one embodiment of the disclosure.

In FIG. 7, the information related to the terminal nodes alternately using the time slots is stored in the memory of every terminal node. The information is related to a time frame that indicates a transmission time of each turn. A beacon shown in FIG. 7 defines a beacon period 70 between a beacon 701 and another beacon 702. Multiple time slots are divided in this beacon period 70 according to particular implementations. It should be noted that the beacons 701 and 702 are used for fixing the time, packet synchronization and calibration.

In this diagram, the vertical axis denotes the channel frequencies 'T×0, R×0, R×1, R×2 and R×3' that are configured to transmit and receive data. The horizontal axis denotes the time slots that are shown in the beacon period 70 between the beacons 701 and 702. The preset time slot allocated to each of the terminal nodes can be one of the time slots in the beacon period 70. The wireless gateway module of the communication system is used to receive uplink packets 721, 722, 723, 724, 725 and 726 from the terminal node. The terminal nodes transmit the uplink packets 721, 722, 723, 724, 725 and 726 over the frequencies Rx0, Rx1, Rx2 and Rx3 via the wireless gateway module. The wireless gateway module is configured to receive the packets within different time slots. Therefore, the system can process the data more efficiently through these time slots.

The wireless transmission module receives the uplink packets from various wireless gateway modules via a channel with frequency Tx0. The response packet, i.e. ACK, is generated in a next preset time slot as receiving the packet. The received packets can be converted to downlink packets 711, 712, 713 and 714 and sent out the downlink packets 711, 712, 713 and 714 via a transmission channel designated by the wireless transmission module.

According to the above embodiments, the wireless gateway module in the system can be a LoRa concentrator that is in charge of one-way data reception. The wireless transmission module is an LBT module supporting long-distance communication. When the LoRa concentrator receives the data from one of the terminal nodes, the LBT module processes the data and sends it out by the control circuit.

The wireless transmission module can generate an ACK packet in a next time slot and also produce the downlink packet after the wireless gateway module transmits the uplink packet in the preset time slot. This invention achieves a low latency transmission and guarantees data delivery under this rapid response mechanism.

Figure 8:
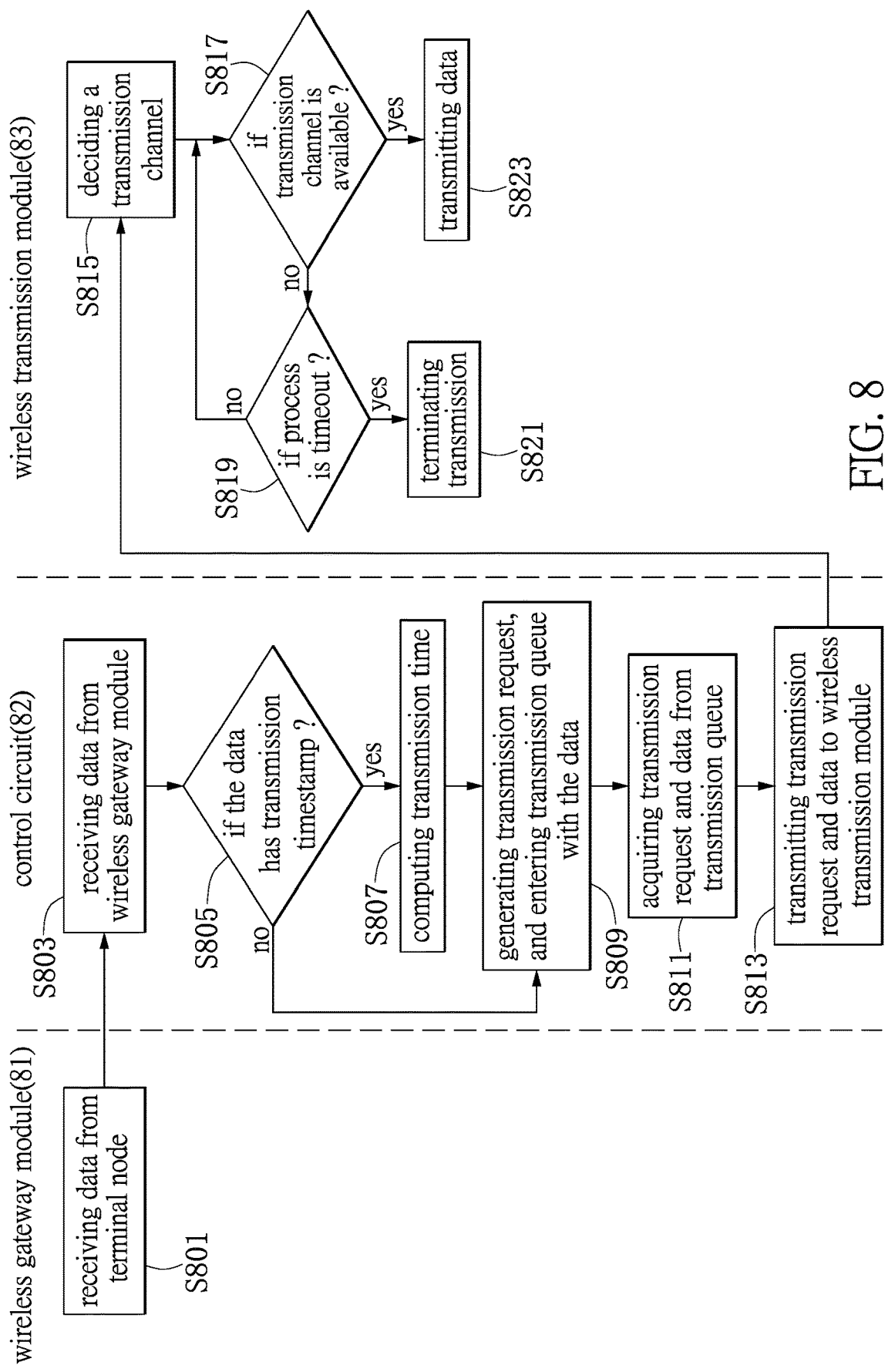
FIG. 8 shows a flow chart describing a process for setting up a transmission schedule in the method for long-distance full-duplex wireless communication in one embodiment of the disclosure.

FIG. 8 shows a flow chart describing the method for long-distance full-duplex wireless communication according to one embodiment of the disclosure. The shown communication system essentially includes a wireless gateway module 81, a control circuit 82 and a wireless transmission module 83.

In a beginning, such as in step S801, the wireless gateway module 81 receives data transmitted by a terminal node under a transmission rate. The data such as message and ACK forms an uplink packet transmitted by the terminal node over a channel within a preset time slot. Next, in step S803, the gateway controller of the wireless gateway module 81 transmits a transmission request to the control circuit 82. The control circuit 82 receives message from the wireless gateway module 81. In step S805, the control circuit 82 determines whether or not the message includes a transmission time based on the timestamp according to the time information of the data. The time information of the data is exemplified as a timestamp. The message is such as an ACK signal that initiates a process of data transmission since the message packet includes the timestamp.

Before the time to receive the message, a step for determining if the message includes the transmission timestamp is performed. If the message includes the transmission timestamp, step S807 is performed. In step S807, a transmission time can be computed according to the packet size of the message when the time required by the system for processing the process is considered. In step S809, a processor of the control circuit 82 calculates the transmission time required by the system according to the information relating to the message. The transmission time can be calculated by the control circuit 82 by adding a preset time interval to the time receiving the message. For example, the transmission time can be obtained by referring to the operating time required by the wireless transmission module 83.

The control circuit 82 generates a transmission request that is sent to a transmission queue with the message. The transmission request is the data sent to the wireless transmission module 83. Otherwise, if the message has no transmission timestamp, a transmission request is generated by skipping the step S807. The message and the transmission request enter the transmission queue for waiting for a transmission instruction.

The message entering the transmission queue is the data waiting for delivery. If the control circuit 82 acquires the transmission time, the data can be retrieved from the transmission queue. In step S811, the control circuit 82 acquires the transmission request and the data queued in the transmission queue according to the transmission time. Next, in step S813, the control circuit 82 transmits transmission instruction including the transmission request and the data to the wireless transmission module 83. The wireless transmission module 83 generates a response packet within a next preset time slot. The data is converted to the downlink packet. In step S815, a transmission channel with a specific frequency set for transmitting the data is decided.

After specifying a transmission channel for transmitting the data, the control circuit 82 then determines whether or not the transmission channel is available for the transmission. In step S817, if the transmission channel is not available, the controller of the wireless transmission module 83 starts a timer and goes on determining if the transmission channel is available. In the meantime, in step S819, the controller of the wireless transmission module 83 also determines if this process is timed out by counting the time and comparing it with a time threshold.

Under the circumstance without timeout, the wireless transmission module 83 goes on determining if the channel is free for transmitting data, such as in step S817. The process will not be terminated until it detects a timeout event, such as in step S821. Further, under the circumstance without timeout, a preset time slot and transmission channel are provided for the system to transmit the data if any transmission channel is found to be available, such as in step S823.

In one embodiment, the abovementioned steps S817 through S823 implement the process of Listen Before Talk mechanism. When the communication system receives a SYN signal from a terminal node through the wireless gateway module 81, a transmission process is initiated. The control circuit 82 performs a process of clear channel assessment, and instructs the wireless transmission module 83 to detect if any transmission channel is free for the transmission. The LBT mechanism allows the communication system to assess if any channel is free for transmission or non-free in advance. The control circuit responds the ACK signal to the terminal node if any channel is found to be free.

Figure 9:
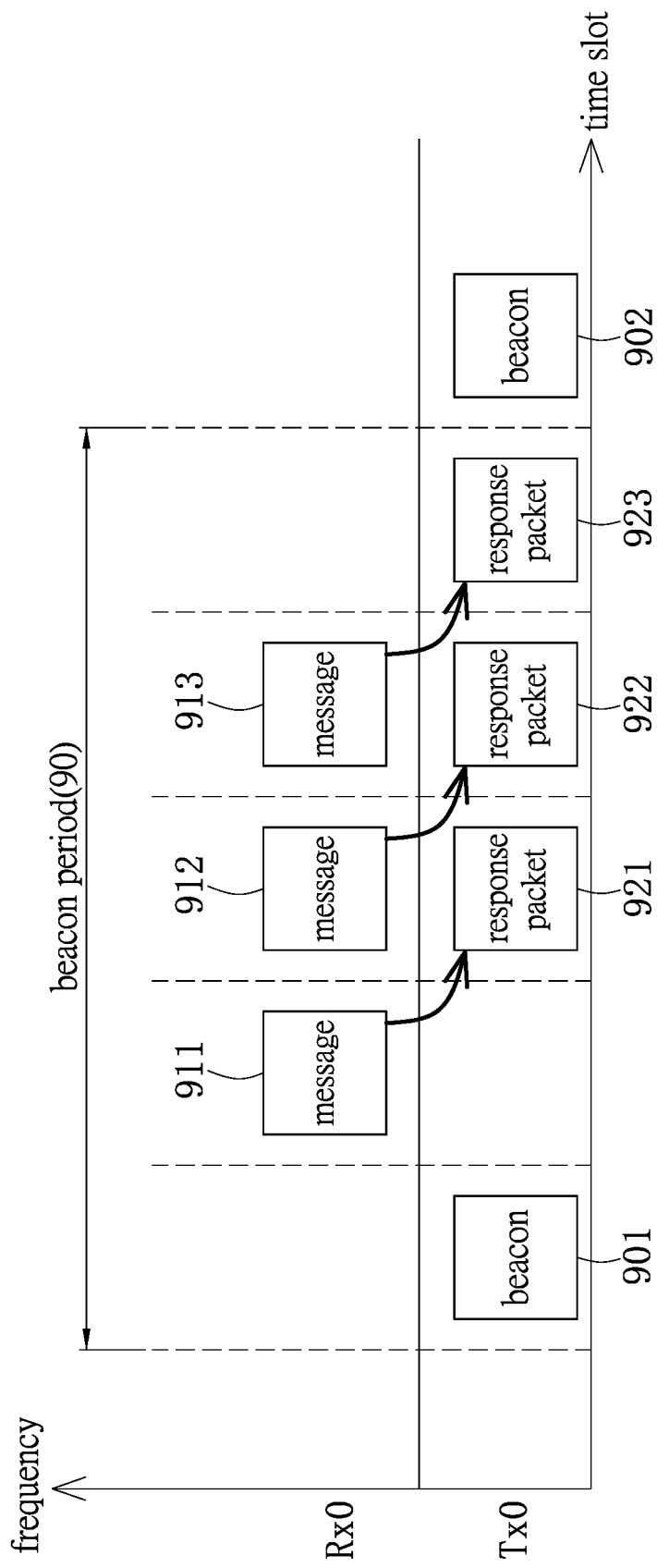
FIG. 9 shows a chart describing data transmission in the method for long-distance full-duplex wireless communication in one embodiment of the disclosure.

FIG. 9 shows a flow chart for transmitting data in the method for long-distance full-duplex wireless communication according to one embodiment of the disclosure.

A plurality of time slots are divided within a beacon period 90 between a beacon 901 and another beacon 902. The terminal node is allowed to send the messages 911, 912 and 913 to the wireless gateway module within different time slots under frequency Rx0 in a proper order. When receiving these messages 911, 912 and 913, the wireless transmission module responds the response packets, e.g. ACKs 921, 922 and 923, to the terminal node in different next time slots, as indicated by the arrows shown in the diagram. This process can guarantee that the data delivery has been completed.

Figure 10:
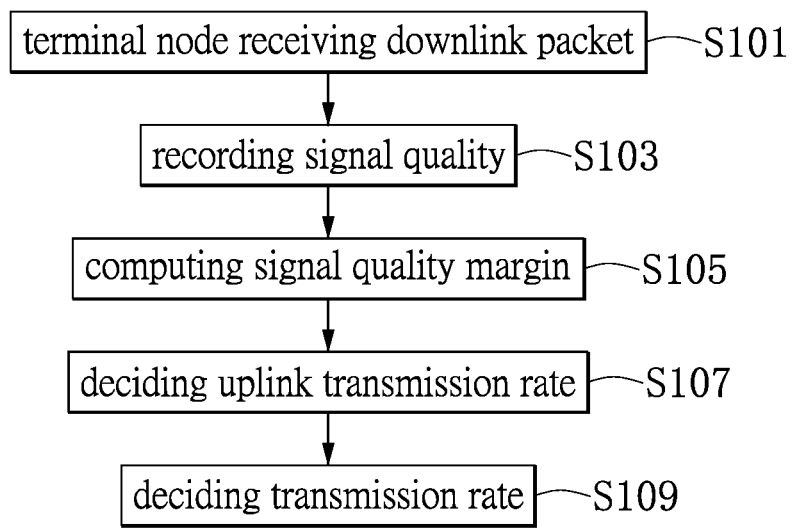
FIG. 10 shows a flow chart describing setting up a transmission rate for a node in the method of the disclosure.

The communication system allows the terminal node to set up a transmission rate dynamically. The terminal node can adjust its transmission rate based on a signal quality of the downlink data from the gateway. One of the important indications of the signal quality is to compute a margin of the signal quality. The signal quality margin allows the terminal node to decide an uplink transmission rate. Reference is made to FIG. 10 that shows a flow chart of setting up a transmission rate in the terminal node.

In step S101, the terminal node receives the downlink packets from a wireless gateway module. The terminal node can retrieve the signal quality from the downlink packets. In step S103, the signal quality is recorded. A good signal quality means a lower bit error rate, less signal-to-noise ratio (SNR), and a higher received signal strength indication (RSSI).

Next, in step S105, a software sequence running in the terminal node computes the signal quality margin. The signal quality margin is relevant to the signal bandwidth that is referred to in assessing if the signal quality exceeds an acceptable predetermined quality. For example, when a receiver determines a signal quality margin, its transmission parameters are able to be adjusted to decide a transmission rate while linking with a transmitter.

In the present embodiment, in step S107, an uplink transmission rate can be decided based on the signal quality margin. In step S109, a transmission rate for the terminal node is decided.

To sum up, the method for long-distance full-duplex wireless communication is applied to a communication system that essentially includes one or more wireless gateway modules for receiving data and at least one wireless transmission module for transmitting data at a specific transmission time. A control circuit is provided for performing the method. For achieving full-duplex communication, a transmission schedule is set for every terminal node to transmit data with different frequencies using designated time slots based on its individual operating environment. The transmission schedule allows the system to set up a transmission priority subject to different time slots and different frequencies. The related setting can be stored in each of the terminal nodes. If any node generates data, the data can be transmitted with low latency and full duplex communication according to a transmission schedule.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for long-distance full-duplex wireless communication, adapted to a communication system that includes one or more wireless gateway modules connecting one or more terminal nodes through multi-channel technology to receive data from every terminal node, a wireless transmission module for transmitting data, and a control circuit connecting to the one or more wireless gateway modules and the wireless transmission module via a connection line, the method comprising:
   receiving data from a terminal node by a wireless gateway module, wherein the data is an uplink packet transmitted from the terminal node via a channel within a preset time slot, wherein the preset time slot and the channel of the uplink packet are stored in a memory of the terminal node, and different terminal nodes transmit the uplink packets within different preset time slots or different channels;
   after receiving the data, the wireless gateway module generating a response packet within a next preset time slot, wherein the data is transformed to a downlink packet; and
   determining a transmission channel by the wireless transmission module to transmit the downlink packet.

2. The method as recited in claim 1, wherein, when receiving the data from the wireless gateway module, the control circuit computes a transmission time according to a packet size and a transmission timestamp of the data, and generates a transmission request, and both the transmission request and the data enter a transmission queue.

3. The method as recited in claim 2, wherein the control circuit acquires the transmission request and the data from the transmission queue according to the transmission time, the transmission request and the data are transmitted to the wireless transmission module, and the downlink packet is transmitted after transformation of the transmission request and the data by the wireless transmission module.

4. The method as recited in claim 3, after deciding the transmission channel, further comprising a step of determining whether or not the transmission channel is available; wherein if the transmission channel is not available, a timer is activated and the step for determining whether or not the transmission channel is available continues until timeout; otherwise if the transmission channel is available, the downlink packet is sent out.

5. The method as recited in claim 1, wherein every terminal node is configured to set a transmission rate by the steps including:
   receiving a packet from one of the wireless gateway modules, and to acquire a signal quality;
   computing a signal quality margin according to the signal quality;
   determining the transmission rate according to the signal quality margin; and
   setting up the transmission rate for the terminal node.

6. The method as recited in claim 1, wherein the preset time slot and the channel where the plurality of terminal nodes transmit their individual data to plan a schedule and the steps of planning the schedule includes:
   obtaining transmission parameters from every terminal node;
   setting up the preset time slot and the channel for the terminal node according to an operating environment of the terminal node; and
   planning the schedule by the terminal node storing the preset time slot and the channel.

7. The method as recited in claim 6, wherein the preset time slot of the terminal node is one of multiple time slots within a beacon period.

8. A communication system, comprising:
   one or more wireless gateway modules, each of which including a gateway controller and a wireless gateway transceiver, connecting one or more terminal nodes by a multi-channel technology for receiving data transmitted by the terminal nodes;

a wireless transmission module configured to include a wireless transceiver and a controller for transmitting data; and a control circuit connecting and controlling the one or more wireless gateway modules and the wireless transmission module via a connection line;

wherein one of the wireless gateway modules receives data from one terminal node, and the data is an uplink packet that is transmitted by the terminal node in a channel within a preset time slot, in which the preset time slot and channel of the uplink packet transmitted by the terminal node are stored in a memory of the terminal node and different terminal nodes transmit the uplink packets within the different preset time slots or different channels;

wherein the wireless transmission module receives the data, and generates a response packet within a next preset time slot; the data is converted to be a downlink packet; and the wireless transmission module decides a transmission channel to send out the downlink packet.

9. The system as recited in claim 8, wherein the wireless gateway module is a long range (LoRa) concentrator, and the wireless transmission module is an LBT module that supports a LoRa communication protocol; in the communication system, the LBT module processes data received by the one or more LoRa concentrators through the control circuit; the LoRa concentrator of the communication system is set as a one-way receiving concentrator that is combined with a one-way LBT module.

10. The system as recited in claim 8, wherein, when receiving the data from the wireless gateway module, the control circuit computes a transmission time according to a packet size and a transmission timestamp of the data, and generates a transmission request, and both the transmission time and the data enter a transmission queue.

11. The system as recited in claim 10, wherein the control circuit acquires the transmission request and the data from the transmission queue according to the transmission time, the transmission request and the data are transmitted to the wireless transmission module, and the downlink packet is transmitted after transformation of the transmission request and the data by the wireless transmission module.

12. The system as recited in claim 11, wherein, after deciding the transmission channel, further comprising a step of determining whether or not the transmission channel is available; wherein, if the transmission channel is not available, a timer is activated and the step for determining whether or not the transmission channel is available continues until timeout; otherwise if the transmission channel is available, the downlink packet is sent out.

13. The system as recited in claim 8, wherein, every terminal node is configured to set a transmission rate by the steps including:
   allowing the terminal node to receive a packet from one of the wireless gateway modules, and acquire a signal quality;
   computing a signal quality margin according to the signal quality;
   determining the transmission rate according to the signal quality margin; and
   setting up the transmission rate for the terminal node.

14. The system as recited in claim 8, wherein the preset time slot and the channel of individual data transmitted by the plurality of terminal nodes transmit create a schedule and the steps of planning the schedule include:
   obtaining transmission parameters from every terminal node;
   setting up the preset time slot and the channel for the terminal node according to an operating environment of the terminal node; and
   planning the schedule by the terminal node storing the preset time slot and the channel.

\* \* \* \* \*